(12) United States Patent
Honda

(10) Patent No.: US 6,550,591 B2
(45) Date of Patent: Apr. 22, 2003

(54) RESERVOIR APPARATUS AND AUXILIARY RESERVOIR

(75) Inventor: Yukihiro Honda, Yokosuka (JP)

(73) Assignee: Bosch Braking Systems Co., Ltd., Tokyo (JP)

(*) Notice: Subject to any disclaimer, the term of this patent is extended or adjusted under 35 U.S.C. 154(b) by 0 days.

(21) Appl. No.: 09/999,668

(22) Filed: Oct. 19, 2001

(65) Prior Publication Data

US 2002/0063026 A1 May 30, 2002

(30) Foreign Application Priority Data

Nov. 28, 2000 (JP) ......................... 2000-360643

(51) Int. Cl.[7] .................... B60T 11/00; B60T 11/26; B60T 17/06
(52) U.S. Cl. ..................... 188/352; 60/585; 188/358
(58) Field of Search ............... 188/352, 345, 188/358–359; 60/585, 584, 592, 586; 303/114.1, 114.2; 220/86.2

(56) References Cited

FOREIGN PATENT DOCUMENTS

| JP | 58-48555 | 4/1983 |
|---|---|---|
| JP | 8-2007 | 1/1996 |
| WO | 9917967 | * 4/1999 |

* cited by examiner

*Primary Examiner*—Douglas C. Butler
(74) *Attorney, Agent, or Firm*—Frommer Lawrence & Haug, LLP; Ronald R. Santucci

(57) ABSTRACT

To provides a technique capable of replenishing a working fluid smoothly while employing a method for replacing an atmospheric air with the working fluid. The reservoir apparatus (10) includes a main reservoir (20) having an inlet opening for feeding a hydraulic fluid, and an auxiliary reservoir (50) connecting thereto through a piping (30). There is a diagonally extending connecting pipe (60) at the auxiliary reservoir (50). There is a recessed portion (80) at an opening portion (64) of an inner periphery of the connecting pipe (60). This recessed portion (80), when compared with the case where there is no such a recessed portion, serves to enlarge the opening portion (64) of the connecting pipe (60) and more smoothly flow the replenishment working fluid at a nearby area of the opening portion (64). By doing so, the opening portion (64) of the connecting pipe (60) can be more enlarged at the time of replenishment of the working fluid and formation of a film of the working fluid can be prevented at the opening portion (64).

6 Claims, 2 Drawing Sheets

RESERVOIR APPARATUS AND AUXILIARY RESERVOIR

BACKGROUND OF THE INVENTION

1. Field of the Invention

This invention relates to a reservoir technique for supplying a working fluid to a master cylinder of vehicles, and more particularly to a reservoir of the type which comprises an auxiliary reservoir located proximal or close to a master cylinder and a main reservoir having a hydraulic fluid inlet opening and connected to the auxiliary reservoir through a piping.

2. Related Art

A master cylinder of vehicles essentially requires a working fluid for operating the braking system, etc. It is the reservoir apparatus which stores the working fluid. Experience teaches that work is also necessary for supplying a working fluid to the reservoir apparatus or replacing the working fluid with new one.

There is known a reservoir apparatus which has been developed taking into consideration the replenishing work and replacing work of the working fluid and in which a hydraulic fluid inlet opening for the working fluid is arranged at a located where both the replenishing work and the replacing work can easily be made. For example, as shown in a microfilm (first example of the related art) of Japanese Utility Model Application No. S56-14365 (Japanese Utility Model Application Unexamined Publication No. S58-48555), the reservoir apparatus is divided into an auxiliary reservoir and a main reservoir, both of the reservoirs are connected to each other through a piping such as a hose or the like, and an inlet opening for feeding a hydraulic fluid is arranged at a location where it does not interfere other devices (in other words, at a location easy to work). This conventional invention is based on an idea that the auxiliary reservoir is arranged at a location proximal to a master cylinder so that a working fluid can be supplied to the master cylinder rapidly and smoothly, while the other main reservoir is provided with a hydraulic fluid inlet opening and arranged at a location where a hydraulic fluid can easily be supplied therein. According to this idea, the incompatible requirements for installing the master cylinder in a limited space together with other devices and for enabling the replenishment or replacement of the working fluid with ease can be satisfied at the same time.

According to the technique shown in the first example of the related art, the connecting portion of the piping on the auxiliary reservoir side located proximate to the master cylinder is disposed in an upright posture on an upper part of the auxiliary reservoir. However, in that form, the height of the auxiliary reservoir on the master cylinder becomes high as a whole and the mounting space of the master cylinder with the auxiliary reservoir attached thereto becomes large. In order to reduce the mounting space, the connecting portion of the piping is, as disclosed in Japanese Utility Model Publication No. H08-2007 (second example of the related art), preferably slanted with respect to a direction of the height of the auxiliary reservoir.

3. Problems to be Solved

The inventor of the present invention paid attention to the technique for diagonally drawing out the connecting portion of the pining or the connecting pipe for connecting the piping from the upper part of the auxiliary reservoir and carried out an extensive experiment and study about replenishment property of the working fluid into the auxiliary reservoir. As a result, he found out a fact that a film of the working fluid is formed at an opening portion of the connecting pipe which faces the inside of the auxiliary reservoir at the time of replenishment and therefore, there is such a risk that the film jeopardizes the replenishment property of the working fluid. Incidentally, the replenishment of the working fluid into the auxiliary reservoir is conducted in such a manner that the working fluid is supplied from the hydraulic fluid inlet port of the main reservoir and replaced with air in the auxiliary reservoir through the piping. Accordingly, when the working fluid flows from the main reservoir side towards the auxiliary reservoir side, the air in the auxiliary reservoir (i.e., air to be replaced with the working fluid) flows from the auxiliary reservoir side towards the main reservoir side. As a method for preventing the formation of the film which covers the opening portion, it can also be considered that the inside of the auxiliary reservoir is evacuated or reduced in pressure, i.e., the method of vacuum breathing is applied. However, it is required for vacuum breathing to employ extra equipment such as a vacuum pump and in addition, the operation is troublesome. In this respect, the method for replacing the atmospheric air on the auxiliary reservoir side with the working fluid from the main reservoir side does not require extra devices and the operation is easy.

SUMMARY OF THE INVENTION

Object of the Invention

It is, therefore, an object of the present invention to provide a technique capable of replenishing a working fluid smoothly while employing a method for replacing an atmospheric air with the working fluid.

It is another object of the present invention to provide a technique capable of enhancing the replenishment property of a working fluid merely by slightly changing the configuration or constitution of an auxiliary reservoir located proximal to a master cylinder.

Other objects of the present invention will become more clear from the following description.

Means for Solving the Problems

When the air in an auxiliary reservoir is replaced with a working fluid, the working fluid which flows into the auxiliary reservoir from an opening portion of a connecting pipe is affected by the air flowing from the auxiliary reservoir side towards the main reservoir side (flow reverse to the flow of the working fluid). Probably, the air forms a film, i.e., the so-called "soap bubble", covering the opening portion using the viscous working fluid as a "soap bubble liquid". The basis of this invention for solving the problems is to provide a constitution in which the film, i.e., "soap bubble" covering the opening portion, is difficult to be formed.

Based on such basis, according to this invention, the connecting pipe is provided at its opening portion with a recessed portion and/or protruded portion for changing the configuration of the opening portion. The recessed portion and/or protruded portion used herein refers to a) only recessed portion but the number of the recessed portion is not limited to one, b) only protruded portion but the number of the protruded portion is not limited to one, and c) a combination of a) and b). The auxiliary reservoir including the connecting pipe is usually a molded article from synthetic resin. The recessed portion and/or protruded portion can easily be formed by molding.

The form for preventing the generation of the film which covers the opening portion is preferably a recessed portion disposed at a lower side of the opening portion, and particularly preferably a recessed portion extending downward when viewed in a direction of the height of the auxiliary reservoir, one end of the recessed portion being connected to the inner side of the connecting pipe and the other end of the recessed portion being extended along the inner wall of the auxiliary reservoir from the opening portion and reaching the lower part. The recessed portion of this case has the function for enlarging the size of the opening portion and enhancing a more smooth flow of the replenishment working fluid at the nearby area of the opening portion when compared with a case where there is no such recessed portion. Owing to this function of the recessed portion, it can be considered that the opening portion of the connecting pipe is more enlarged even at the time for replenishment of the working fluid thereby preventing the generation of the film of the working fluid. In contrast, the protruded portion is preferably disposed at an upper part of the opening portion. The protruded portion has the function for defining a plurality of passageways at the upper part of the opening portion thereby dividing the flow of air from the flow of working fluid. Owing to this function of the protruded portion, it can be considered that the effect of the flow of air to be prevailed on the replenishment working fluid becomes so small that no film of the working fluid is formed at the opening portion.

As another form of the protruded portion, the opening portion of the connecting pipe may be disposed in such a manner as to be orthogonal to a direction of the height of the auxiliary reservoir. In that case, the entire opening portion is located at the uppermost part of a reservoir space formed within the auxiliary reservoir. Consequence, as the replenishment working fluid fills the reservoir space in the auxiliary reservoir, the entire opening portion is choked with the working fluid almost at the same time (i.e., instantaneously) on the last stage of the filling operation. Accordingly, it can be consistently avoided that the size of the opening portion of the connecting pipe is gradually reduced. Since it is considered that the film covering the opening portion, i.e., the so-called "soap bubble" is generated in a state in which the size of the connecting pipe is gradually reduced, another form of the protruded portion as mentioned is also effective.

DETAILED DESCRIPTION OF THE EMBODIMENT

Figure 1:
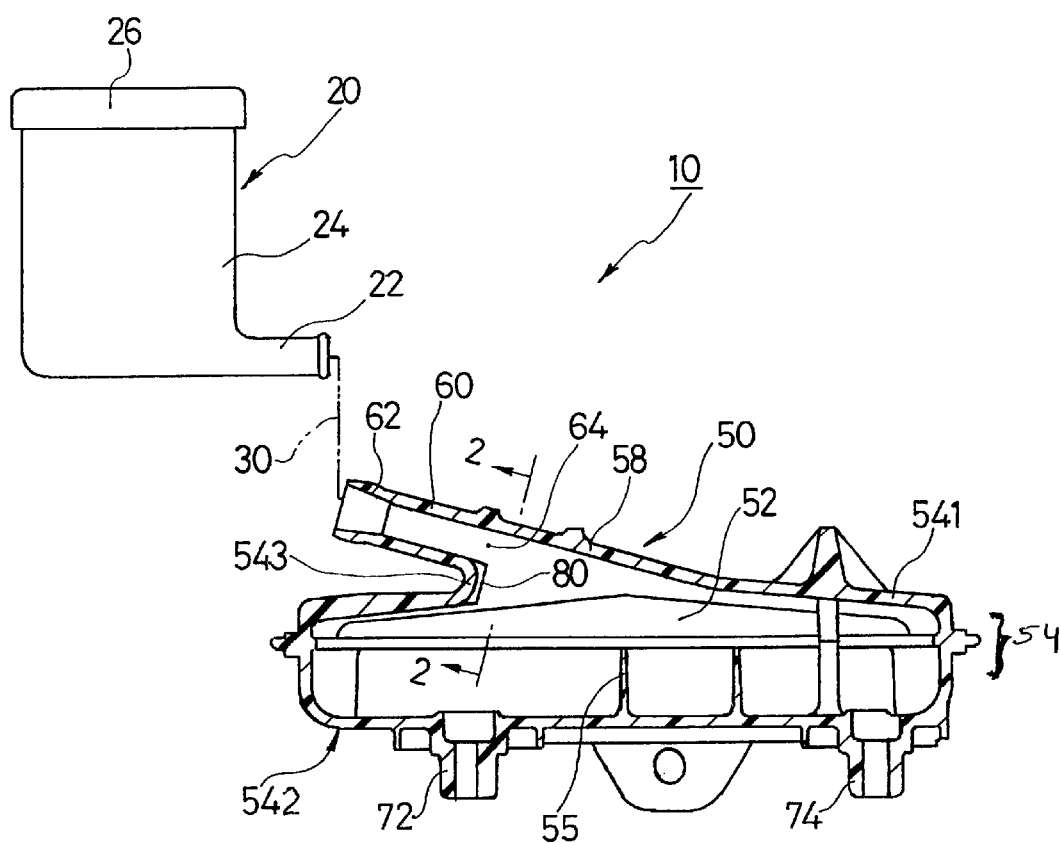
FIG. 1 is a view showing one embodiment of a reservoir apparatus to which the present invention is applied.

FIG. 1 shows one embodiment of the present invention in which the present invention is applied to a reservoir apparatus for use of a tandem type master cylinder and in which an auxiliary reservoir portion is shown in a sectional view. A reservoir apparatus 10 as one embodiment of the present invention comprises a main reservoir 20 arranged at a location easy to conduct the replenishing operation, and an auxiliary reservoir 50 supported on a cylinder main body of a master cylinder not shown. The main reservoir 20 comprises a container main body 24 including a piping connecting portion 22, and a cap 26 for covering an upper opening of the container main body 24. By removing the cap 26, the upper opening of the container main body 24 can serve as an inlet opening for feeding a hydraulic fluid. Since a fluid surface detector means (not shown) including a float is received in the container main body 24 of the main reservoir 20, the capacity of the main reservoir 20 is larger than that of the auxiliary reservoir 50. The main reservoir 20 is arranged at a location higher than the auxiliary reservoir 50 so that a working fluid can normally be supplied to the auxiliary reservoir 50 through a piping 30 such as a hose or the like.

The auxiliary reservoir 50 has a capacity large enough to fill the amount of fluid used for operation of a brake. The height of a container main body 54 is gradually lowered by about 2 to 3 cm. The container main body 54 is of two-split structure consisting of an upper half section 541 and a lower half section 542. The upper and lower half sections 541, 542 are integrally joined by heat welding. The upper half section 541 of the container main body 54 is provided at an upper part thereof with a connecting pipe 60 which diagonally runs with respect to a direction of the height of the auxiliary reservoir 50. On the other hand, the lower half section 542 is provided at a lower part thereof with two nipple portion 72, 74 extending in a direction of the height of the auxiliary reservoir 50. The connecting pipe 60 is a member for connecting an internal reservoir space 52 of the container main body 54 to the main reservoir 24 side through the piping 30. An end portion of the connecting pipe 60 on the side protruding outward serves as a piping connecting portion 62. A passage way formed at an inner periphery of the piping connecting portion 62 is in communication with the inside of the container main body 54 through an opening portion 64 formed at its end. The two nipple portions 72, 74 are adapted to connect the auxiliary reservoir 50 to a boss portion of the cylinder main body of the master cylinder. The interior of the container main body 54, more strictly that portion of the lower half section 542, is divided into two parts by a partition wall 55. The nipple portion 72 is located at one of the two parts, and the other nipple portion 74 is located at the other part. This arrangement is made for the purpose of ensuring the independency of two brake systems, namely, a primary brake system and a second brake system.

It is necessary to fill up the reservoir space 52 in the auxiliary reservoir 50 with the working fluid. If not, air may mix therein and trouble is likely to occur to the braking operation. To this end, the upper half section 541 of the container main body 54 is more protuberated at a part of the upper wall portion thereof than the rest portion, and only the protuberated portion includes a protuberant portion 58 for enlarging the reservoir space 52 to the extent of the protuberated portion. The protuberant portion 58 is gradually slanted upward from one side thereof towards the other side. That end of the protuberant portion 58 on the higher side is defined as a flattened surface where the opening portion 64 of the connecting pipe 60 is arranged. Accordingly, the opening portion 64 of the connecting pipe 60 is located at the uppermost part of the reservoir space 52 of the container main body 54. The inside diameter of the connecting pipe 60 is, for example, about 5 mm. At the time for replenishing the interior of the container main body 54 with the working fluid, the working fluid gradually fills the reservoir space 52 while pushing out the internal air of the auxiliary reservoir 50 through the main reservoir 24, the piping 30 and the connecting pipe 60. As previously mentioned, due to effect of the air to be replaced, a film of the working fluid material tends to be formed at the opening portion 64. In order to prevent the generation of the film, a recessed portion 80 is formed at a lower part of the opening portion 64 in this embodiment. The recessed portion 80 extends downward along a direction of the height of the auxiliary reservoir 50. One end of the recessed portion 80 is located at the inner periphery wall surface of the connecting pipe 60 and the other end reaches so far as to the inner wall of the upper half section 541. An inner wall portion 543 of the upper half section 541 where the recessed portion 80 is disposed is orthogonal to a direction of extension of the protuberant portion 58 and the connecting pipe 60 connected thereto. In other words, the inner wall portion 543 is slanted, for example, about 15 degrees (this angle is equal to the angle of inclination of the connecting pipe 60) with respect to the direction of the height of the auxiliary reservoir 50. The width of the groove-like recessed portion 80 is about 4 mm which is smaller than the inside diameter of the connecting pipe 60.

Figure 2:
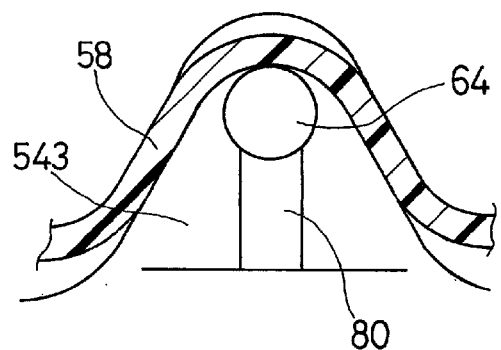
FIG. 2 is a sectional view taken on line 2—2 and viewed in a direction as shown by arrows of FIG. 1.
Figure 3A:
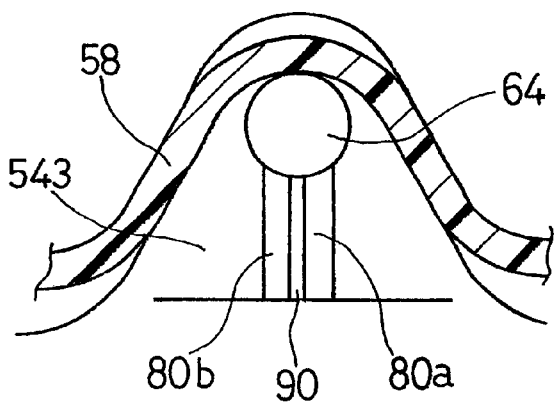
FIGS. 3A, 3B and 3C are similar views to FIG. 2, in which modified forms of the present invention are shown.
Figure 3B:
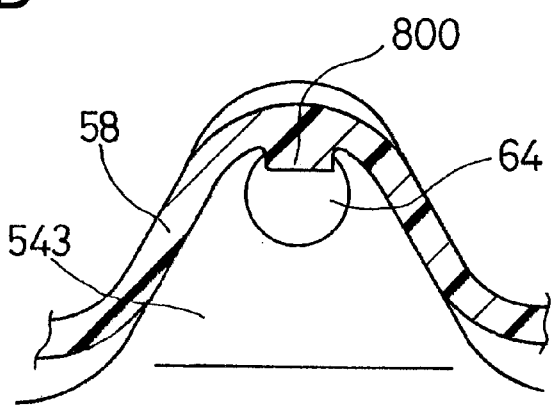
Figure 3C:
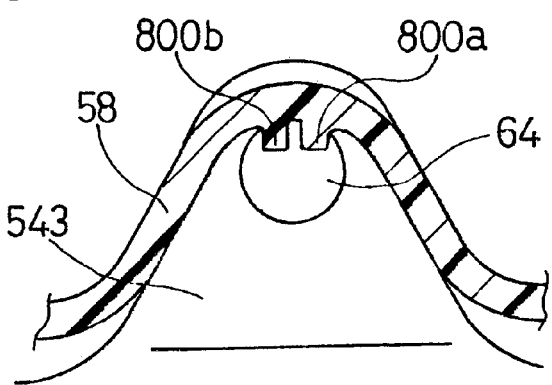

While the one embodiment of the reservoir apparatus 10 has been specifically shown and described herein, the invention itself is not to be restricted by the exact showing of FIGS. 1 and 2 or the description thereof. The present invention can be applied to the reservoir apparatus in modified forms, such as a form having two recessed portions 80a, 80b separated by a central projection 90 (refer to FIG. 3A), a form having one protruded portion 800 disposed at an upper part of the opening portion 64 (refer to FIG. 3B), and a form having two protruded portions 800a, 800b disposed at an upper part of the opening portion 64 (refer to FIG. 3C).

What is claimed is:

1. A reservoir apparatus for supplying a working fluid to a master cylinder comprising an auxiliary reservoir locate proximate to said master cylinder, and a main reservoir located more away from said master cylinder than said auxiliary reservoir, said main reservoir having an inlet opening for feeding a hydraulic fluid and connected to said auxiliary reservoir through a piping, wherein said auxiliary reservoir includes a container main body defining therein a reservoir space for containing a working fluid, and a connecting pipe which is integral with said container main body and runs diagonally with respect to a height direction thereof, one end of which is an opening portion which is open at an uppermost part of said reservoir space and other end portion of which is protruded from said container main body and serves as a connecting portion for said piping, said connecting pipe is provided at said opening portion with recessed portion and/or a protruded portion preventing the working fluid from forming a film which covers said opening portion when air stayed within said reservoir space is replaced with the working fluid and wherein said container main body is more protuberated at a part of a wall portion thereof than the rest portion, only said protuberated portion includes a protuberant portion for enlarging said reservoir space, said protuberant portion is gradually slanted upward from one side thereof towards the other side, and said opening portion is located at the higher side of said slanted portion of said protuberant portion.

2. A reservoir apparatus according to claim 1, wherein said protuberant portion has a flattened surface where said opening portion is situated, and said flattened surface is orthogonal to the slanting direction of said protuberant portion.

3. An auxiliary reservoir of a small capacity attached to a master cylinder and through a piping connected to a main reservoir having an inlet opening for feeding a hydraulic fluid, wherein said auxiliary reservoir includes a container main body defining therein a storage space for storing a working fluid, and a connecting pipe which is integral with said container main body and which runs diagonally with respect to a height direction thereof, one end of which is an opening portion which is open at an uppermost part of said reservoir space and the other end portion of which is protruded from said container main body and serves as a connecting portion for said piping, said connecting pipe is provided at said opening portion with a recessed portion and/or a protruded portion for changing the configuration of said opening portion, said recessed portion and/or said protruded portion preventing the working fluid from forming a film which covers said opening portion when air stayed within said reservoir space is replaced with the working fluid and wherein said container main body is more protuberated at a part of a wall portion thereof than the rest portion, only said protuberated portion includes a protuberant portion for enlarging said reservoir space, said protuberant portion is gradually slanted upward from one side thereof towards the other side, and said opening portion is located at the higher side of said slanted portion of said protuberant portion.

4. An auxiliary reservoir according to claim 3, wherein said master cylinder is of tandem type, and said container main body includes two nipple portions connected to said master cylinder side, and one connecting pipe for connecting said piping.

5. An auxiliary reservoir according to claim 3, wherein said container main body is a molded article made from synthetic resin, and said opening portion includes a recessed portion extending downwards in a direction of a lower side, when viewed in a height direction of said auxiliary reservoir, to enlarge said opening portion and having a function for preventing formation of a film which covers said opening portion.

6. An auxiliary reservoir of a small capacity attached to a master cylinder and through a piping connected to a main reservoir having an inlet opening for feeding a hydraulic fluid, wherein said auxiliary reservoir includes a container main body defining therein a storage space for storing a working fluid, and a connecting pipe which is integral with said container main body and which runs diagonally with respect to a height direction thereof, one end of which is an opening portion which is open at an uppermost part of said reservoir space and the other end portion of which is protruded from said container main body and serves as a connecting portion for said piping, said connecting pipe is provided at said opening portion with a recessed portion and/or a protruded portion for changing the configuration of said opening portion, said recessed portion and/or said protruded portion preventing the working fluid from forming a film which covers said opening portion when air stayed within said reservoir space is replaced with the working fluid and wherein said container main body is a molded article made from synthetic resin, and said opening portion includes a recessed portion extending downwards in a direction of a lower side, when viewed in a height direction of said auxiliary reservoir, to enlarge said opening portion and a having function for preventing formation of a film which covers said opening portion.

* * * * *